3,036,131
SUBSTITUTED BIPHENYL GLYOXAL HYDRATES
AND ALCOHOLATES
Guido Cavallini and Elena Massarani, Milan, Italy, assignors to Francesco Vismara S.p.A., Casatenovo (Como), Italy, a firm
No Drawing. Filed July 27, 1959, Ser. No. 829,532
Claims priority, application Great Britain Sept. 24, 1958
7 Claims. (Cl. 260—592)

This invention relates to new glyoxal compounds and is more particularly concerned with substituted-biphenyl glyoxals and functional derivatives thereof, namely the hydrate, alcoholate and non toxic alkali-metal bisulfite addition compounds.

The new substituted biphenyl glyoxals of this invention may be represented by the formula:

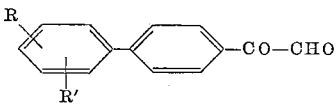

where R represents hydroxy, lower alkoxy of 1 to 4 carbon atoms inclusive, or benzyloxy, and R' represents hydrogen or halogen such as chlorine, fluorine and bromine.

The biphenyl glyoxal hydrate and alcoholate (hemiacetal) addition compounds thereof may be represented by the formula:

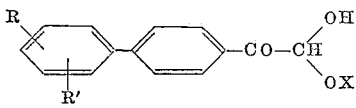

where R and R' are as defined above and X represents hydrogen or a hydrocarbon radical containing from 1 to 12 carbon atoms inclusive.

The compounds of this invention are useful in the synthesis of chemotherapeutically active compounds, in addition to having certain chemotherapeutic activity per se. More specifically the biphenyl glyoxal hydrate and alcoholate compounds are useful as intermediates for the production of substituted α-phenylbenzoyl α-arylaminocarbinol derivatives having a high chemotherpeutic activity, particularly in viral infections as disclosed in our copending application Serial No. 824,927, filed July 6, 1959, now U.S. Patent No. 3,018,305 of which this application is a continuation-in-part application.

Certain of the biphenyl glyoxals of this invention and their corresponding hydrate, alcoholate and non toxic alkali metal-bisulfite addition compounds also possess chemotherapeutic activity against micro-organisms, particularly antiviral activity in some viral infections such as influenza virus (PR 8), hepatitis virus (MHV₃), neurotropic virus (CLM), Herpes simplex, adenovirus, Newcastle disease virus, distemper virus and the like.

Compounds which have proved to be particularly useful are biphenyl glyoxals represented by the following formula:

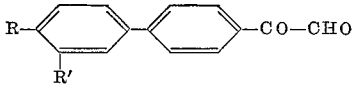

where R is hydroxy or lower alkoxy of 1 to 4 carbon atoms and R' is hydrogen or halogen such as chlorine, bromine or fluorine and the corresponding hydrates and alcoholates represented by the formula:

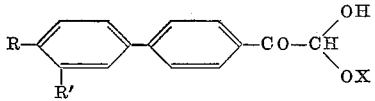

where R and R' are as defined above and X is hydrogen or lower alkyl of 1 to 8 carbon atoms inclusive.

Compounds of the above formulas are active antiviral agents and can be advantageously used as prophylactic as well as chemotherapeutic drugs in the treatment of viral infections and diseases, especially in association with an α-phenylbenzoyl-α-arylamino carbinol disclosed in our copending application Serial No. 824,927.

The substituted biphenyl glyoxals of this invention are prepared from easily available phenylacetophenone derivatives by oxidation with an oxadizing agent, such as selenium dioxide. The corresponding acetophenone compounds are generally well-known in the prior art. In the rare instance in which they are not, a Friedel-Crafts acylation of a substituted diphenyl with acetyl chloride under standard conditions is easily carried out.

Phenylacetophenone derivatives are reacted with selenium dioxide in suitable organic solvent such as dioxane, tetrahydrofuran, acetone, ethanol, benzene and the like. Occasionally oxidation may be carried out in the absence of a solvent. The theoretical amount of selenium dioxide is one mole for one mole of starting phenylacetophenone; however, it is preferred to use an excess, e.g. from about 1.25 to about 5 moles, of oxidizing agent for each mole of starting material. The reaction temperature is from about 30° C. up to the boiling point of the solvent employed and the reaction time can vary from about 30 minutes to about 15 hours depending on the reaction temperature as well as the chemical nature of the starting phenylacetophenone. Preferably the reaction time is from about 1 to 9 hours at temperatures from about 50–100° C.

Oxidation of the phenylacetophenone derivatives carried out under anhydrous conditions, such as in anhydrous dioxane, leads in general to the biphenylglyoxals in an anhydrous state.

The hydrate or alcoholate addition compounds thereof are prepared by reacting the anhydrous glyoxal with water or an alcohol, usually at room or slightly elevated temperature such as up to about 100° C., for from periods of about 10 minutes to about 10 hours. Alternatively biphenyl glyoxal hydrates can be directly obtained from the corresponding phenylacetophenone derivatives by carrying out the oxidation in the presence of water, for example in an aqueous dioxane solution.

The alcoholates are in general obtained by reacting the anhydrous glyoxal or hydrate thereof, with an alcohol, usually in an excess of the alcohol with gentle heating between from about 50° C. to about 80° C. The glyoxal gradually goes into solution. Cooling separates the desired alcoholate addition product.

Alternatively, the crystalline hydrate can be heated in an excess of alcohol in an anhydrous state with removal of the water formed via azeotropic distillation, employing an organic solvent such as benzene, xylene or toluene, to give the desired alcoholate.

The biphenyl glyoxal sodium or potassium bisulfite addition compounds are obtained by the reaction of the glyoxal with an approximately molar equivalent amount of sodium or potassium bisulfite. These addition derivatives are in general more stable than the parent compounds and therefore they are useful for the stabilization of the anhydrous glyoxals. The biphenylglyoxal hydrates or alcoholates of the present invention may be converted into compounds claimed in our copending application Serial No. 824,927 in accordance with the following reaction:

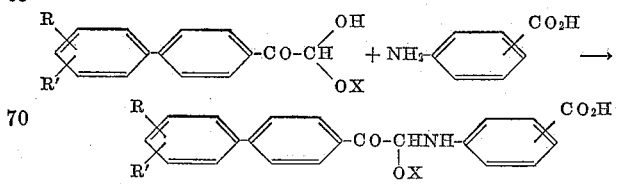

The reaction is carried out by condensing either the alcoholate (hemiacetal) or hydrate addition compounds of a biphenylglyoxal with an aminobenzoic acid with elimination of one mole of water. Specifically, approximately molar equivalent amounts of the addition compound and the aminobenzoic acid in an inert organic solvent in which the reactants are substantially soluble are reacted at from about room temperature i.e. about 25° C. up to the boiling point of the solvent employed for periods of from about 15 minutes to about 24 hours. An excess of either reactant can be employed but with little advantage. The reaction time can vary greatly depending on the reaction temperature as well as the chemical nature of the reactants but reaction temperatures outside of those detailed here are usually of no particular advantage. Preferably the reaction time is from about ½ to 8 hours at temperatures from about 40–100° C. The organic solvent for preparing the ether derivatives is advantageously the alcohol corresponding to the alcoholate addition product involved; thus, for instance, if the alcoholate used as starting material is the methylate, it is advisable to use methyl alcohol as a reaction diluent. If an alcoholate is used, it is preferred to exclude water from the reaction medium. If a hydrate addition compound is used as starting material for preparing a carbinol, non-alcoholic solvents such as aryl solvents, for instance benzene or toluene, ethers or cyclo-alkane solvents are preferably used with alcohol being excluded. This latter restriction however is not a critical restriction on the method. The desired condensation product, a carbinol or its ether, is usually isolated by separating the crystallized solid by filtration following cooling. Alternatively the reaction solvent is removed by evaporation and the residue purified by recrystallization.

The following examples are illustrative of the products of this invention.

Example 1

A mixture of 7.75 g. of selenium dioxide, 2 cc. of water and 20 cc. of dioxane is heated to 70° C. while a solution of 11.13 g. of 4-acetyl-4'-methoxybiphenyl in 60 cc. of dioxane is added dropwise. The mixture is heated at reflux for 5 hours, then filtered hot and partially evaporated. Cooling separates 4'-methoxybiphenylyl-4-glyoxal, M.P. 136–137° C.

A mixture of 8.0 g. of the glyoxal in 100 cc. of absolute ethyl alcohol is heated at reflux for several hours. The clear solution is evaporated slightly then cooled to give the desired ethylate, M.P. 119–120° C.

Operating in the same manner as above and substituting for the ethyl alcohol another suitable alcohol, the methylate, n. propylate, isopropylate, n. butylate, allylate, propargylate and the like of 4'-methoxybiphenylyl-4-glyoxal are obtained.

A solution of 2.58 g. of glyoxal in 270 cc. of 95% ethyl alcohol is treated with 7.5 cc. of saturated aqueous solution of pure sodium bisulphite free from sodium sulphate. After dilution with water the crystalline sodium bisulfite addition compound separates. Yield 3.1 g.

Example 2

A mixture of 3.9 g. of selenium dioxide and 15 cc. of aqueous dioxane is reacted with 6.5 g. of 4'-acetyl-3-chloro-4-methoxybiphenyl (prepared by reacting acetyl chloride with 3-chloro-4-methoxybiphenyl under Friedel-Crafts conditions) in 40 cc. of dioxane as described in Example 1 to give the glyoxal as the hydrate, M.P. 141–142° C.

Sodium bisulfite addition compound is obtained following the same procedure as described in Example 1.

A mixture of 2.8 g. of the hydrate of 3'-chloro-4'-methoxybiphenylyl-4-glyoxal and 30 cc. of anhydrous ethanol in 70 cc. of anhydrous benzene is heated at reflux for 6 hours over a water trap (Org. Syn. 3, 382) having an inner funnel charged with a mixture of phosphorus pentoxide and a filter aid. The mother liquor is then concentrated in vacuo to give the ethylate addition compound, M.P. 85–87° C.

Example 3

A solution of 2.2 g. of 4'-acetyl-4-hydroxybiphenyl (obtained by demethylation of the corresponding 4'-acetyl-4-methoxybiphenyl) in 12 cc. of dioxane is treated with 1.6 g. of selenium dioxide and 9 cc. of aqueous dioxane. The mixture is refluxed for 5 hours, then filtered hot and cooled. 4'-hydroxy-biphenylyl-4-glyoxal hydrate separates, M.P. 168–170° C.

A mixture of 2.8 g. of the hydrate is reacted with ethyl alcohol as in Example 2 to give the ethylate addition compound, M.P. 118–120° C.

Other alcoholates are obtained by reacting 4-hydroxy-biphenylyl-4-glyoxal hydrate with the appropriate etherifying alcohol such as, for example, n. propyl, isopropyl, butyl, hexyl, cyclohexyl, and benzyl alcohols and the like.

Example 4

12.4 g. of 4-acetyl-4'-hydroxy-3'-bromobiphenyl (prepared by hydrolyzing 4-acetyl - 4' - methoxy-3'-bromobiphenyl which is in turn obtained by acetylating 4-methoxy-3-bromobiphenyl as described above) is heated with 7.8 g. of selenium dioxide in dioxane solution for several hours as in Example 1. The free selenium is separated by filtration and the glyoxal separated from the solvent. The glyoxal (5 g.) is heated with 26 cc. of cyclohexanol in benzene as in Example 2 to give the cyclohexylate addition product.

Example 5

A mixture of 11.4 g. of 4-acetyl-5'-chloro-3'-ethoxy-biphenyl (prepared by reacting acetyl chloride under Friedel-Crafts conditions with 5-chloro-3-ethoxybiphenyl which is prepared in the same manner as 3-chloro-4-methoxybiphenyl) and 7 g. of selenium dioxide in dioxane is heated for several hours. The product, isolated as in Example 1, is 5'-chloro - 3' - ethoxybiphenylyl-4-glyoxal. This compound (5.5 g.) is heated in 75 cc. of methyl alcohol for several hours to give the corresponding methylate.

Reaction of the glyoxal with sodium bisulfite solution as in Example 1 provides the sodium bisulfite addition compound.

Example 6

A mixture of 30 cc. of dioxane and 5.4 g. of 4'-acetyl-4-benzyloxybiphenyl (prepared by reacting 4-hydroxybiphenyl with benzyl chloride under standard alkylation conditions, followed by acetylation under Friedel-Crafts conditions) is treated with 2.8 g. of selenium dioxide in 12 cc. of dioxane. The mixture processed as in Example 1 gives 4'-benzyloxybiphenyl-4-glyoxal. The product (4.5 g.) dissolved in 75 cc. of ethyl alcohol is heated at 60° C. for 5 hours. Thus the ethylate of 4'-benzyloxy-biphenylyl-4-glyoxal is obtained.

Example 7

A mixture of 3.5 g. of 4-acetyl 4'-butoxybiphenyl (obtained by the reaction of acetyl chloride on 4-butoxybiphenyl, prepared as in Example 6) and 2 g. of selenium dioxide in dioxane solution is heated for several hours. Cooling after filtration of the free selenium separates the 4'-butoxybiphenylyl-4-glyoxal. This compound (2.7 g.) is reacted with 15 cc. of anhydrous methyl alcohol to give the methylate (2.3 g.).

The glyoxal heated with octyl alcohol in benzene as in Example 2 gives the n-octylate of 4'-butoxybiphenylyl-4-glyoxal.

Example 8

A solution of 9.5 g. of 4-acetyl 2'-ethoxybiphenyl (prepared by reacting 2-ethoxybiphenyl with acetyl chloride under Friedel-Crafts conditions) in 50 cc. of tetrahydrofuran is added dropwise to a mixture of 6.3 g. of selenium dioxide and 25 cc. of tetrahydrofuran. The reaction mixture is heated at 65° C. for seven hours, then filtered hot and partially evaporated. To the residual solution 10 cc. of water are added and the reaction mixture is allowed to stand at room temperature for several hours. The product which separates is the desired 2'-ethoxybiphenylyl-4-glyoxal hydrate. 2 g. of this compound are reacted with 20 cc. of anhydrous n. hexyl alcohol as in Example 2 to give the n. hexylate of 2'-ethoxy-biphenylyl 4-glyoxal.

*Example 9*

A mixture of 15 g. of 4-acetyl 3'-hydroxybiphenyl obtained by acetylating 3-hydroxybiphenyl as described above) and 8.6 g. of selenium dioxide in 150 cc. of tetrahydrofuran is reacted as in Example 8 to give 3'-hydroxy-biphenylyl-4-glyoxal hydrate (9 g.). This compound is suspended in 50 cc. of anhydrous isopropyl alcohol and the mixture stirred and heated at 60° C. for four hours until a clear solution results. Cooling after evaporation gives the desired isopropylate addition product.

*Example 10*

2.8 g. of the hydrate of 3'-chloro-4'-methoxybiphenylyl-4-glyoxal is reacted with 10 g. of citronellol in benzene as in Example 2 to give the citronellyate addition compound.

In a similar manner, the glyoxal is reacted with phenol to give the phenyl ether of 3'-chloro-4'-methoxybiphenylyl-4-glyoxal.

*Example 11*

4'-hydroxy-biphenylyl-4-glyoxal hydrate is reacted as in Example 1 with sodium bisulfite in aqueous ethanol solution to give 4'-hydroxy-biphenylyl-4-glyoxal sodium bisulfite addition product.

In the same manner, the glyoxal is reacted with potassium bisulfite to obtain 4'-hydroxy-biphenylyl-4-glyoxal potassium bisulfite addition product.

We claim:

1. A chemical compound of the formula:

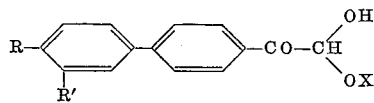

in which R is a member selected from the group consisting of hydroxy, lower alkoxy of 1 to 4 carbon atoms and benzyloxy; R' is a member selected from the group consisting of hydrogen, chlorine, bromine and fluorine; and X is a member selected from the group consisting of hydrogen and lower alkyl of 1 to 8 carbon atoms, inclusive.

2. A chemical compound of the formula:

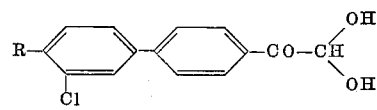

in which R is lower alkoxy of 1 to 4 carbon atoms.

3. A chemical compound of the formula:

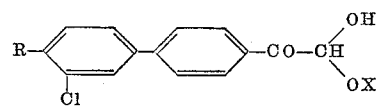

in which R is lower alkoxy of 1 to 4 carbon atoms; and X is lower alkyl of 1 to 8 carbon atoms.

4. A chemical compound having the formula:

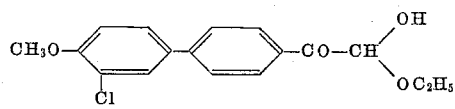

5. A chemical compound having the formula:

6. 3'-chloro-4'-methoxybiphenylyl - 4 - glyoxal hydrate of the formula:

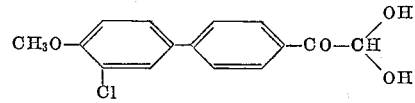

7. 4'-hydroxy-biphenylyl-4-glyoxal hydrate of the formula:

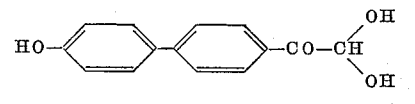

References Cited in the file of this patent

Musante et al.: Gazz. Chim. ital., vol. 80, pp. 868–83 (1950), 260–590.

Fieser et al.: Organic Chemistry (2nd Ed.), pp. 203–5 (1950). (Copies of above in scientific library.)